Patented Feb. 14, 1939

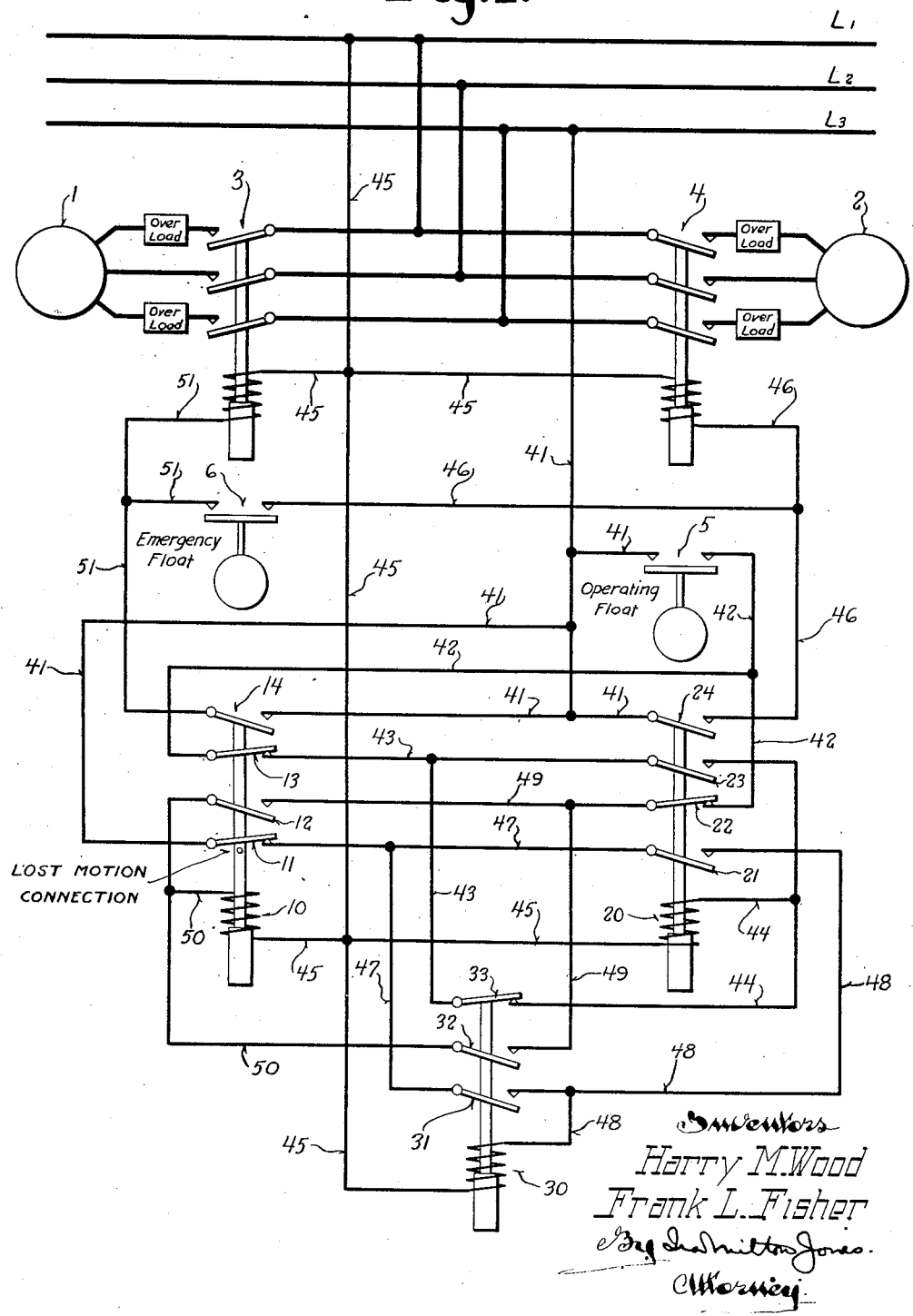

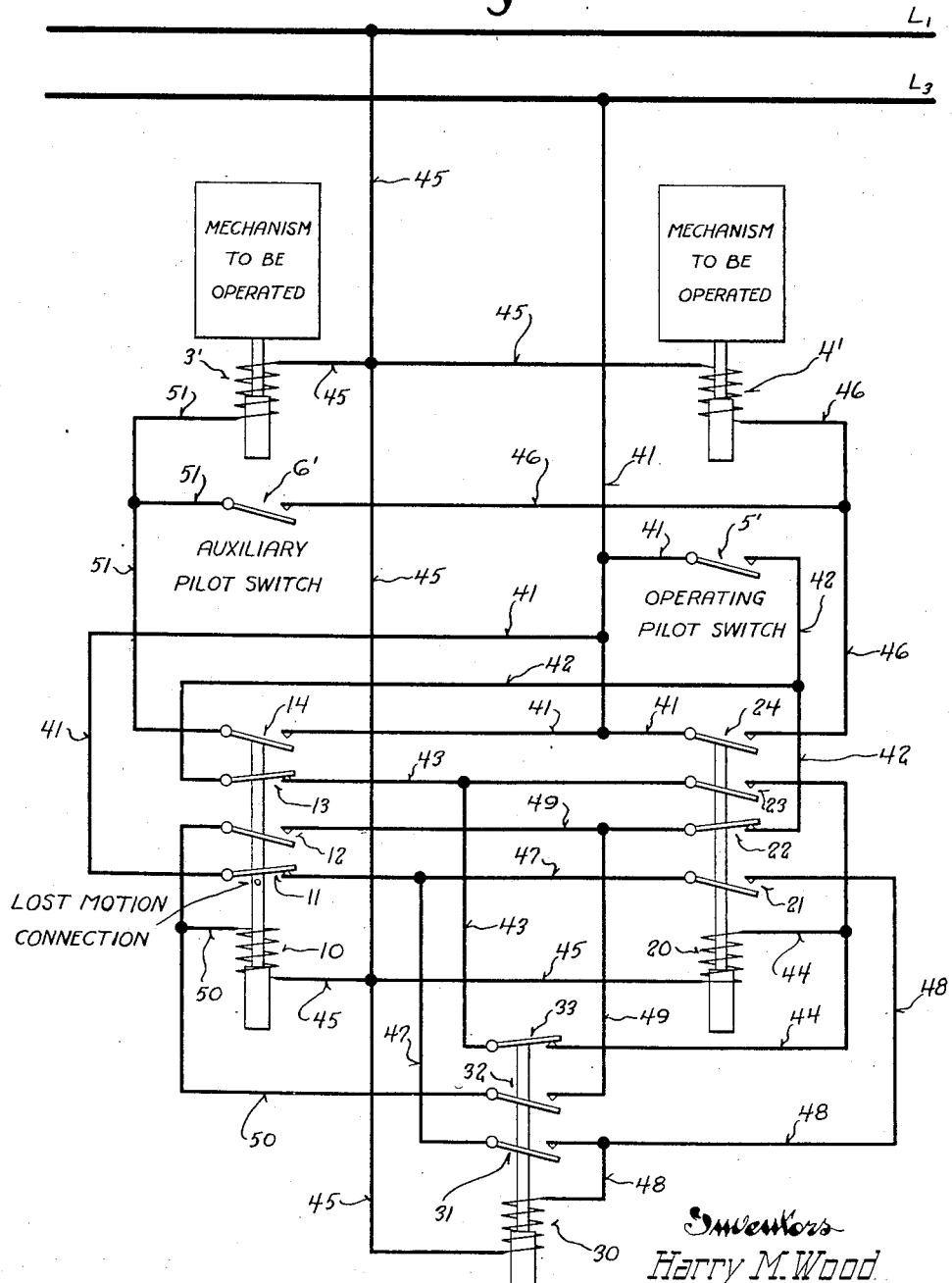

2,147,073

UNITED STATES PATENT OFFICE 2,147,073

ELECTRICAL CONTROL SYSTEM FOR DUAL PUMPING APPARATUS

Harry M. Wood, Baltimore, Md., and Frank L. Fisher, Wauwatosa, Wis., assignors to Allen-Bradley Company, Milwaukee, Wis., a corporation of Wisconsin Application June 5, 1936, Serial No. 83,690

15 Claims. (Cl. 175—375)

This invention relates to the control of two electrically responsive devices which are to be alternately operated upon successive occurrences of a predetermined condition. It also contemplates operation of both devices in unison under certain circumstances such as the continuance of the condition beyond a predetermined point.

It is an object of this invention to provide a control for the motors of two pumps so that the pumps ordinarily operate alternately, and under certain circumstances operate in unison.

By way of general explanation, it is desirable in many situations to have two pumps for ejecting liquids from a tank, sump, or other receptacle, the pumps operating one at a time and in alternate manner, but capable of being simultaneously operated in case the capacity of one pump is insufficient to discharge the liquid as rapidly as it accumulates.

Heretofore, it has been customary to effect the desired alternate control or operation of the motors by mechanical mechanism coacting with the floats which close the switches governing the operation of the motors. When the conditions under which these pumps operate are borne in mind, it becomes apparent that such a mechanical interlocking mechanism is not entirely reliable, and it is therefore a particular object of this invention to provide a control to effect the desired alternate operation of the pump motors which is entirely electrical in operation and does not involve mechanical mechanism apt to become stuck or requiring considerable manual attention.

Besides obviating the need for objectionable mechanical mechanisms with their attendant disadvantages and their necessity for constant manual attention, the present invention attains a degree of simplicity not possible with the past systems of control.

The subject matter of this invention further contemplates a control system which is fully automatic, positive in operation, and which does not require any manual attention whatsoever, except occasional inspection.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiment of the invention constructed according to the best modes so far devised for the practical application of the principles thereof, and in which:

Figure 1 is a diagrammatic illustration of this invention applied to the control of a dual pumping system; and Figure 2 is a similar diagrammatic view showing the general application of the invention.

Referring now particularly to the accompanying drawings, the numerals 1 and 2 designate the two electric motors for driving the pumps (not shown). These motors are adapted to be connected across lines $L^1$, $L^2$, and $L^3$ upon closure of electromagnetically actuated starter switches 3 and 4, respectively, the circuits leading from the lines through the switches 3 and 4 to the motors being conventional and obvious from the drawings.

The desired alternate operation of the motors 1 and 2, or more directly, the closure of their starter switches 3 and 4, respectively, is initiated and takes place at the dictation of a control switch 5, float controlled to close when the float rises in response to a rising liquid level in the sump which the pumps (not shown) are designed to empty.

In the event the accumulation of liquid within the sump is more rapid than the capacity of one pump, the continued rise of the liquid level in the sump lifts a second or emergency float located at a higher level than the operating float controlling the switch 5, to close an emergency float switch 6 which acts to cut in whichever pump is idle so that thereafter both pumps operate until the liquid level drops below the emergency float.

The manner in which the closure of the operating float switch 5 effects alternate operation of the motors 1 and 2 will be first described without regard to the functioning of the emergency float valve 6.

The starter switch 3, associated with motor 1, is closed upon energization of a relay 10, which controls switches 11, 12, 13 and 14.

The closure of the motor starter switch 4 associated with motor 2 is effected directly upon the energization of a relay 20 controlling switches 21, 22, 23 and 24.

Upon closure of the operating float switch 5, either the relay 10 or 20 is energized, depending upon whether or not a third relay 30 is energized or deenergized. The relay 30 has a maintaining switch 31 and two other switches 32 and 33 so connected that when one is open, the other is closed, and vice versa.

When the switch 33 is closed, the closure of the operating float switch 5 will effect energization of relay 20, and when the switch 32 is closed, the closure of the operating float switch 5 will effect energization of the relay 10.

These three relays 10, 20 and 30 are so electrically connected with each other and with the operating float switch 5 and the starter switches 3 and 4 as to effect the desired alternate functioning of the motors 1 and 2. The specific connections will be described in the following recitation of the operation of the system.

Operation

With the system at rest in the condition depicted in the drawings, not any of the three relays are energized and the motor switches 3 and 4 are both open. Likewise, the operating float switch 5 is open. Upon closure of the operating float switch 5, relay 20 is energized by the closure of the following circuit.

This circuit may be traced as follows:—Starting with line $L^3$, through conductor 41 to one side of switch 5, through the switch to conductor 42 which leads to one side of switch 13 of relay 10, continuing through this switch, which is closed by virtue of the deenergization of relay 10, to conductor 43, one branch of which leads to one side of closed switch 33 of relay 30, through switch 33 to conductor 44, and thus to one side of the solenoid of relay 20. The other side of the solenoid of relay 20 is connected to main line $L^1$ through conductor 45.

The completion of the circuit just traced effects energization of the relay 20 closing its switches 21, 23 and 24, and opening its switch 22. Closure of the switch 23 maintains the energizing circuit for the relay 20 as follows:—Starting with line $L^3$, the circuit is made by conductor 41 through float switch 5 and conductor 42 to one side of switch 13, through conductor 43 to one side of switch 23, and from the other side of switch 23 through conductor 44 to one side of relay 20. From the other side of relay 20, the circuit is continued through conductor 45 back to line $L^1$.

As a result of this operation of relay 20, the motor starter switch 4 is closed and the relay 30 is energized.

The energizing circuit for the starter switch 4 is as follows:—Again starting with line $L^3$, this circuit is made by conductor 41 which leads to one side of switch 24 which being closed continues the circuit through to conductor 46 leading to one side of the solenoid of starter switch 4, the other side of this solenoid being connected to line $L^1$ through conductor 45.

Energization of the relay 30 is effected by the closure of the following circuit:—Again beginning with line $L^3$, this circuit is made by conductor 41 which leads to one side of switch 11 of relay 10, which switch being closed continues the circuit to conductor 47 leading to one side of switch 21. Switch 21 is closed so that the circuit continues to conductor 48 which leads to one side of the solenoid of relay 30 and also to one side of its retaining switch 31. The other side of the solenoid of relay 30 is connected to conductor 45 and thus back to line $L^1$.

As the relay 30 is energized, it closes its maintaining switch 31, closes its switch 32, and opens its switch 33. The closure of its maintaining switch 31 maintains the relay 30 energized independently of the relay 20. The manner in which this is effected is clear from the drawing, as one side of the solenoid of relay 30 is connected through conductor 45 with line $L^1$, while the other side of the solenoid of relay 30 is connected through conductor 48, the closed switch 31, conductor 47, switch 11, and conductor 41, with line $L^3$.

The condition of the system at this stage is as follows:—Operating float switch 5 is closed; relay 20 is energized; relay 30 is energized; and motor starter switch 4 is closed so that motor 2 is operating. As the liquid level descends, the float controlling switch 5 drops until the switch 5 is open. Upon opening of the switch 5, the energizing circuit for the relay 20 is broken so that the relay 20 drops open and as a consequence of its switch 24 opening, the circuit for the solenoid of motor starter switch 4 is also opened, thus stopping motor 2.

At this point, the relays 10 and 20 are deenergized, the motor switches 3 and 4 are open, but the relay 30 is energized by reason of its maintaining switch 31 being closed.

With the next successive rise of the operating float and the closure of its switch 5, it is desired that the motor starting switch 3 shall be closed and the motor starter switch 4 remain open to effect the desired alternate operation of the pump motors. Upon closure of the float switch 5, the relay 20 cannot be energized as switch 33 which must be closed to complete its energizing circuit is open in view of the energization of relay 30.

Closure of the float switch 5 does, however, close the energizing circuit of relay 10. This circuit can also be traced along conductor 42 to one side of switch 22 which is closed, then through conductor 49 to one side of switch 32, which is now closed. Passing through closed switch 32, the circuit is continued along conductor 50 which leads to one side of the solenoid of relay 10. The other side of the solenoid of relay 10 is connected through conductor 45 to line $L^1$. The circuit for the solenoid of relay 10 is thus complete and its energization is effected.

Upon the energization of the relay 10, its switches 11 and 13 are opened and its switches 12 and 14 are closed. The closure of the switch 12 maintains energization of the relay 10 through the following circuit:—Again beginning with line $L^3$, this circuit follows conductor 41, float switch 5, conductor 42, closed switch 22, conductor 49, closed switch 12, and conductor 50 to one side of the relay 10. The other side of the relay 10 is connected with line $L^1$ through conductor 45.

The closure of the switch 14 effects energization of the solenoid of starter switch 3, the circuit therefor being from line $L^3$ through conductor 41 to one side of switch 14 through switch 14 to conductor 51 which leads to one side of the solenoid of starter switch 3, and from the other side thereof through conductor 45 to line $L^1$. Motor 1 is thus set in operation.

The energization of relay 10, specifically the opening of its switch 11, also effects deenergization of relay 30 as the closure of switch 11 is necessary to the maintenance of its energizing circuit. The opening of switch 11 is delayed by any suitable means as the provision of a lost motion connection between it and its actuator to insure closure of switch 12 to maintain solenoid 10 energized ahead of the opening of switch 32 which occurs with the deenergization of relay 30 upon opening of switch 11. The manner in which the opening of the switch 11 effects deenergization of the relay 30 can be readily traced on the diagram.

With the system in the now established condition, operating float switch 5 is closed; relay 10 is energized; starter switch 3 is closed, so that motor 1 is operating, while relays 20 and 30 are deenergized.

Upon reopening of the operating float switch 5 as a result of the lowering of the liquid level effected by the operation of the pump driven by motor 1, the energizing circuit of relay 10 is opened inasmuch as the closure of switch 5 is necessary to maintain the energizing circuit of relay 10.

Upon the deenergization of the relay 10, its switches 11 and 13 are closed, and its switches 12 and 14 opened so that the system is again restored to its initial condition ready for the next cycle.

*Dual operation of motors for emergency purposes*

As pointed out hereinbefore, in the event the inflow of liquid into the sump is greater than the capacity of one pump, an emergency condition exists and both pumps must be set in operation. To this purpose, the emergency float and its switch 6 is provided, located, however, at a higher elevation than the float controlling the switch 5. This switch 6, as shown, is connected directly across the solenoids of the starter switches 3 and 4 by conductors 46 and 51.

Assuming that the starter switch 4 is closed and the motor 2 is in operation, the closure of the switch 6 would initiate the operation of motor 1 as follows:—One side of the solenoid of motor starter switch 3 is connected to line L¹ through conductor 45. The other side of the solenoid is connected through conductor 51 to one side of emergency float switch 6. The other side thereof is connected by conductor 46 to switch 24, and the other side of switch 24 connected through conductor 41 to line L². An energizing circuit for the solenoid of starter switch 3 is thus completed and will remain so until the switch 6 reopens.

In the event that motor 1 is in operation and the emergency calls for the boosting action of motor 2, closure of the emergency float switch will effect closure of an energizing circuit for the solenoid of starter switch 4 as follows:— Again beginning with line L¹, conductor 45 leads to one side of the solenoid of motor starter switch 4, the other side thereof being connected through conductor 46 to one side of switch 6 which continues the circuit through the conductor 51 to then closed switch 14. From the opposite side of closed switch 14, the circuit is completed through conductor 41, which leads back to line L².

As pointed out hereinbefore, this invention is not restricted to the control of the electric motors of a dual pumping apparatus, but has a more general and broader application, as shown in Figure 2. In this embodiment of the invention, the pilot switches 5' and 6' are shown as conventional switches not necessarily operated by floats, but capable of being actuated by any prime mover such as a pressure responsive element, a thermostat or any other suitable means.

The electromagnets 3' and 4' obviously may actuate any mechanism to be controlled which is operable by electromagnets. Where the previously described application of the invention specifically contemplates the control of electric motors, these units may be readily replaced by valves, mechanical motion generating devices, or any other devices.

From the foregoing description taken in connection with the accompanying drawings, it will be readily apparent to those skilled in the art, that this invention provides a control for the alternate and also concomitant energization of two electromagnets controlling motor switches or any other mechanism actuatable by electromagnets, which is entirely electrical, incorporating no mechanical switch-over mechanism, and one which requires no manual attention and is entirely dependable and automatic in operation.

What we claim as our invention is:

1. In combination with two main switches for starting electric motors and the like, a single control switch, and an electric control system connecting the control switch with said two main switches so that successive closures of the control switch effects alternate closure of the two main switches, said system including a relay energized concomitantly with the closure of one main switch and deenergized concomitantly with the closure of the other main switch, said relay having switch means for determining which of the two main switches is to be closed in response to closure of the control switch.

2. In combination with two main electromagnetic switches, a single control switch and an electric control system connecting the control switch with said two main electromagnetic switches so that successive closures of the control switch effects alternate closure of the two main switches, said control system including two relays, one associated with one main switch and the other associated with the other main switch in such a manner that energization of the relays effects the closure of their associated main switches, a third relay having switch means for determining which of the two main switches is to be closed in response to closure of the control switch, said third relay being biased to one position and electromagnetically movable to its other position, and circuit arrangements interconnecting the switches of the first two relays with said third relay so that said third relay is energized concomitantly with the energization of one of said two relays and deenergized concomitantly with the energization of the other of said two relays.

3. In combination with two main electromagnetic switches, a single control switch, and an electrical control system for controlling the two main electromagnetic switches so that successive closures of the control switch effects alternate closure of the main electromagnetic switches, said system comprising two relays each having a plurality of switches adapted to be opened and closed upon energization of the relays, certain of said switches controlling energization of the main electromagnetic switches, said two relays being energizable upon closure of the control switch, and means automatically operable to allow only one of said relays to be energized at one time and to effect alternate energization of said relays upon successive closures of the control switch, said means comprising a standard electromagnetic relay in which the armature and associated movable switch elements are biased to one position and electromagnetically held in the other position, and said standard relay being energized concomitantly with the closure of one main switch and deenergized concomitantly with the closure of the other main switch.

4. In combination with a plurality of main electromagnetic switches, a single control switch, and a system of electrical control whereby said main switches are successively closed one at a time upon successive closures of the control switch, said system comprising automatic switches, one associated with each main electromagnetic switch to control energization thereof, means for actuating said automatic switches automatically upon closure of the control switch, and a relay energized concomitantly with the closure of one automatic switch and deenergized concomitantly with the closure of the other automatic switch for automatically determining which of said automatic switches is to be closed upon closure of the control switch.

5. An electrical control system of the character described comprising two electromagnets, a controlling switch associated with each of said electromagnets, a pilot switch adapted to be automatically closed, relays for controlling the two controlling switches, means for energizing the relays upon closure of the pilot switch, and an electrical automatic switch-over means for preventing simultaneous energization of said two relays upon closure of the pilot switch and automatically operable to effect alternate energization thereof upon successive closures of the pilot switch, said switch-over means incorporating a relay, and means for controlling energization of said relay from said first two mentioned relays so that said last named relay is energized when one of said first two relays is energized and is deenergized when the other of said first two relays is energized.

6. In combination with two translating devices, a pilot switch and an electric control system connecting the pilot switch with said two translating devices so that successive closures of the pilot switch effects alternate operation of the two translating devices, said system including a relay energized concomitantly with the operation of one translating device and deenergized concomitantly with the operation of the other translating device, said relay having switch means for determining which of the two translating devices is to be operated in response to closure of the pilot switch.

7. In combination with two translating devices, a pilot switch and an electric control system connecting the pilot switch with the two translating devices so that successive closures of the pilot switch effects alternate operation of the two translating devices, said control system including two relays, one associated with one translating device and the other associated with the other translating device in such a manner that functioning of the relays effects operation of their associated translating devices, and a third relay energized at the dictation of one of said first two relays and deenergized concomitantly with the energization of the other of said two relays, said third relay being operable to determine which one of the first mentioned two relays will be energized upon closure of the pilot switch.

8. In combination with two electromagnets, a pilot switch and an electric control system connecting the pilot switch with the two electromagnets so that successive closures of the pilot switch effects alternate energization of the two electromagnets, said control system including a first relay associated with one electromagnet and a second relay associated with the other electromagnet, said first and second relays having switches, and a third relay energized at the dictation of a switch of the first relay and deenergized by the opening of a switch of the second relay, the third relay having switch means adapted when the third relay is deenergized to cause energization of the first relay upon closure of the pilot switch and having other switch means adapted when the third relay is energized to cause energization of the second relay upon closure of the pilot switch, and said switch of the second relay which controls the deenergization of the third relay operating with a delayed action so as to insure energization of said second relay before the deenergization of the third relay.

9. In combination with two electromagnets, a main pilot switch responsive to a predetermined condition, an electric control system connecting the pilot switch with said two electromagnets so that successive closures of the pilot switch in response to successive occurrences of the predetermined condition effects alternate energization of the two electromagnets, said system including a relay energized concomitantly with the energization of one electromagnet and deenergized concomitantly with the closure of the other electromagnet, said relay having switch means for determining which of the two electromagnets is to be energized in response to closure of the pilot switch, and an auxiliary pilot switch connected in the system and operable upon the continuance beyond a predetermined point of the condition closing the main pilot switch for effecting energization of whichever electromagnet is then deenergized.

10. An electric control system comprising two electromagnets, an operating pilot switch adapted to be automatically closed upon the occurrence of a predetermined condition, an auxiliary pilot switch adapted to be automatically closed upon the continuance beyond a predetermined point of said condition, electric circuits connecting the pilot switches with the electromagnets, and relays connected in said circuits, there being one relay for each of the two electromagnets so connected therewith by said circuits that operation of the relays effects energization of their respective electromagnets and another relay adapted to be energized upon response of one of said first two relays and deenergized upon response of the other of said two relays, said other relay having switches for determining which of the first two relays is to respond to closure of the operating pilot switch, and said auxiliary pilot switch being so connected with the electromagnets through said circuits and switches of said first two relays as to effect energization of whichever electromagnet is deenergized upon closure thereof.

11. In combination, a plurality of translating devices, a pilot switch, an electromagnetically actuated relay for each translating device adapted to be energized to initiate the operation of its translating device, an additional relay, an electric circuit connecting the translating devices, the pilot switch and the relays for controlling the translating devices from the pilot switch, said additional relay being energized concomitantly with the energization of one of said two relays and deenergized concomitantly with the energization of the other of said two relays to shift the control of the pilot switch from one to the other of said translating devices.

12. In combination with two electromagnets, a pilot switch and an electric control system connecting the pilot switch with the two electromagnets so that successive closures of the pilot switch effects alternate energization of the two electromagnets, said control system including a first relay associated with one electromagnet and a second relay associated with the other electromagnet, said first and second relays having switches, and a third relay energized at the dictation of a switch of the first relay and deenergized by the opening of a switch of the second relay, the third relay having switch means adapted when the third relay is deenergized to cause energization of the first relay upon closure of the pilot switch and having other switch means adapted when the third relay is energized to cause energization of the second relay upon closure of the pilot switch.

13. An electrical control system, comprising a source of E. M. F., two main electromagnets, a pilot switch, three standard two position electromagnetic relays, each having its armature and associated switches biased to one position and electromagnetically held in the other position, and circuit arrangements interconnecting the main electromagnets, the pilot switch, and the three standard relays with the source of E. M. F. in such a manner that successive closures of the pilot switch alternately energize two of said standard relays to alternately effect energization of the main electromagnets and alternately energize and deenergize the third relay upon successive closures of the pilot switch, and switch means actuated by said third relay and so connected in said circuit arrangements as to alternately shift the control of the pilot switch from one to the other of said first two mentioned relays.

14. In a control system of the character described, a source of E. M. F., a pilot switch, a first electroresponsive device, a second electroresponsive device, said first and second devices having switches, a third electroresponsive device, and circuit arrangements interconnecting said pilot switch and said electroresponsive devices with the source of E. M. F. so that said third device is energized at the dictation of a switch of the first device and deenergized by the opening of a switch of the second device, the third device having switch means adapted when said third device is deenergized to cause energization of the first device upon closure of the pilot switch and having other switch means adapted when the third device is energized to cause energization of the second device upon closure of the pilot switch.

15. In combination with two main switches for starting electric motors and the like, a single control switch, and an electric control system connecting the control switch with said two main switches so that successive closures of the control switch effect alternate closure of the two main switches, said system including one single coil two position relay energized concomitantly with the closure of one main switch and maintained energized after opening of said main switch to effect closure of the other main switch upon the next subsequent closure of the control switch and to be deenergized upon closure of said other main switch and to remain deenergized after opening of said other main switch to restore the control system to its initial condition at which closure of the control switch effects closure of the first designated main switch.

HARRY M. WOOD.
FRANK L. FISHER.